US012749038B2

(12) United States Patent
Mukherjee et al.

(10) Patent No.: US 12,749,038 B2
(45) Date of Patent: Sep. 29, 2026

(54) DIGITAL WORKER SKILL OVERLAP MITIGATION

(71) Applicant: INTERNATIONAL BUSINESS MACHINES CORPORATION, Armonk, NY (US)

(72) Inventors: Kushal Mukherjee, New Delhi (IN); Vinod Muthusamy, Austin, TX (US); Vatche Isahagian, Belmont, MA (US); Jayachandu Bandlamudi, Guntur (IN); Siyu Huo, White Plains, NY (US); Sampath Dechu, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 18/531,772

(22) Filed: Dec. 7, 2023

(65) Prior Publication Data

US 2025/0190922 A1 Jun. 12, 2025

(51) Int. Cl.
*G06Q 10/0639* (2023.01)

(52) U.S. Cl.
CPC .............................. *G06Q 10/06398* (2013.01)

(58) Field of Classification Search
CPC ............. G06Q 10/063; G06Q 10/0639; G06Q 10/06398
See application file for complete search history.

(56) References Cited

U.S. PATENT DOCUMENTS

| | | | |
|---|---|---|---|
| 8,799,000 B2 | 8/2014 | Guzzoni | |
| 8,942,986 B2 | 1/2015 | Cheyer | |
| 9,465,833 B2 | 10/2016 | Aravamudan | |
| 9,805,718 B2 | 10/2017 | Ayan | |
| 10,388,285 B2 | 8/2019 | Hirzel | |
| 10,679,631 B2 | 6/2020 | Hirzel | |
| 10,832,681 B1 | 11/2020 | Jethva | |
| 11,302,330 B2 | 4/2022 | Ge | |
| 2012/0166178 A1* | 6/2012 | Latzina | G06F 40/237 704/9 |
| 2018/0131645 A1 | 5/2018 | Magliozzi | |
| 2018/0300395 A1* | 10/2018 | Weinstein | G06F 16/3344 |
| 2019/0361719 A1 | 11/2019 | Vangala | |

(Continued)

FOREIGN PATENT DOCUMENTS

WO WO-2024044491 A1 * 2/2024 ........... G06F 40/295

OTHER PUBLICATIONS

Alfieri, Andrea, Ralf Wolter, and Seyyed Hadi Hashemi. "Intent disambiguation for task-oriented dialogue systems." Proceedings of the 31st ACM International Conference on Information & Knowledge Management. 2022. (Year: 2022).*

(Continued)

*Primary Examiner* — William S Brockington, III

(74) *Attorney, Agent, or Firm* — Amin, Turocy & Watson, LLP

(57) ABSTRACT

A method, a structure, and a computer system for mitigating digital worker skill overlap. Exemplary embodiments may include detecting a similarity between a first skill and a second skill assigned to a digital worker, generating a disambiguation question to disambiguate the first skill from the second skill, and disambiguating the first skill from the second skill based on an answer to the disambiguation question.

20 Claims, 4 Drawing Sheets

(56) References Cited

U.S. PATENT DOCUMENTS

| | | | | |
|---|---|---|---|---|
| 2020/0106881 | A1* | 4/2020 | Beaver | G06F 16/35 |
| 2021/0390259 | A1* | 12/2021 | Hildick-Smith | G06F 40/30 |
| 2023/0252975 | A1* | 8/2023 | Vishnoi | H04L 51/02<br>704/260 |
| 2023/0376700 | A1* | 11/2023 | Bista | G06F 40/284 |
| 2024/0020484 | A1* | 1/2024 | Will, IV | G06F 3/167 |
| 2024/0289407 | A1* | 8/2024 | Rofouei | G06F 16/9577 |

OTHER PUBLICATIONS

Author Unknown, "Disambiguation Dialogs", LivePerson Developers, Accessed: Oct. 16, 2023, https://developers.liveperson.com/conversation-builder-dialogs-disambiguation-dialogs.html, 13 pages.

Kuhn et a., "CLAM: Selective Clarification for Ambiguous Questions with Generative Language Models", arXiv:2212.07769v2 [cs.CL] Feb. 20, 2023, 17 pages.

Kumari et al., "Context-Based Question Answering System with Suggested Questions", IEEE, 2022 12th International Conference on Cloud Computing, Data Science & Engineering (Confluence), Jan. 27-28, 2022, https://ieeexplore.ieee.org/document/9734207, 6 pages.

* cited by examiner

300

DIGITAL WORKER SKILL OVERLAP MITIGATION

BACKGROUND

The exemplary embodiments relate generally to digital workers, and more particularly to mitigating skill overlap of digital workers.

Digital workers are a category of software robots that are trained to perform specific tasks or processes in partnership with human colleagues. Digital workers are assigned the skills needed to perform the tasks and multiple digital workers may be orchestrated to simultaneously perform multiple tasks.

SUMMARY

The exemplary embodiments disclose a method, a computer program product, and a computer system for mitigating digital worker skill overlap. Exemplary embodiments include detecting a similarity between a first skill and a second skill assigned to a digital worker, generating a disambiguation question to disambiguate the first skill from the second skill, and disambiguating the first skill from the second skill based on an answer to the disambiguation question.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION

Figure 1:
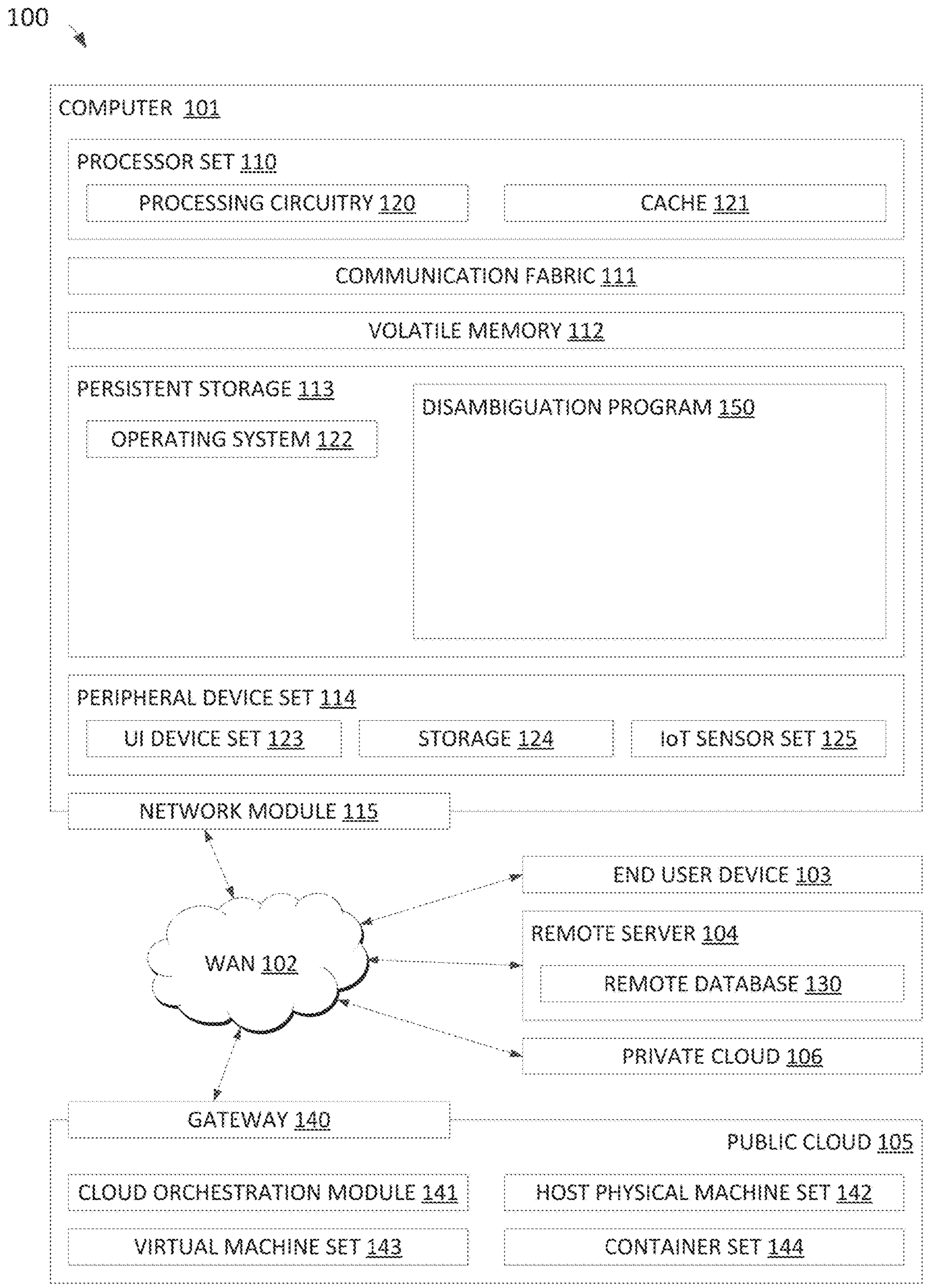
FIG. 1 depicts an exemplary block diagram depicting the components of computing environment 100, in accordance with the exemplary embodiments.

According to an aspect of the invention, there is provided a computer-implemented method, computer program product, and computer system for mitigating digital worker skill overlap. The aspect of the invention includes detecting a similarity between a first skill and a second skill assigned to a digital worker, generating a disambiguation question to disambiguate the first skill from the second skill, and disambiguating the first skill from the second skill based on an answer to the disambiguation question. This aspect of the invention provides the technical benefit of reducing errors and improving performance of a digital worker by eliminating ambiguity resulting from the invocation of multiple skills.

In embodiments, the aspect of the invention further includes prompting the disambiguation question when at least one of the first skill and the second skill are subsequently invoked. This embodiment provides the technical advantage of improving an efficiency of the aspect of the invention by immediately resolving ambiguity between skills within subsequent multi-skill invocations without the need to generate a disambiguation question.

In embodiments, the generating of the disambiguation question further includes identifying one or more exclusive entities that are exclusive to the first skill or the second skill and generating the disambiguation question based on the one or more exclusive entities. This embodiment provides the technical benefit of identifying an entity for distinguishing between the multiple invoked skills and generating the disambiguation question based thereon.

In embodiments, the identifying the one or more exclusive entities further includes applying an exclusive or (XOR) logic operation to entities associated with the first skill and the second skill. This embodiment provides the technical advantage of identifying an entity for distinguishing between the multiple invoked skills based on the entity corresponding exclusively to only one of the skills.

In embodiments, the generating of the disambiguation question further includes receiving a natural language explanation differentiating the first skill from the second skill, identifying a key phrase within the natural language explanation, and generating the disambiguation question based on the key phrase. This embodiment provides the technical benefit of improving digital worker accuracy and efficiency through disambiguation based on one or more key phrases within an explanation differentiating the multiple, invoked skills.

In embodiments, the identifying the key phrase further includes generating embeddings for the natural language explanation and one or more strings within the natural language explanation, and identifying as the key phrase the one or more strings having the embedding with a shortest distance from the embedding of the natural language explanation. This embodiment provides the technical advantage of improving digital worker performance by disambiguating the multiple, invoked skills using a key phrase within the natural language explanation.

In embodiments, the detecting the similarity between the first skill and the second skill further includes determining whether a similarity between at least one of a description, utterance, entity, input, and output corresponding to the first skill and the second skill exceed a threshold. This embodiment provides the technical benefit of improving digital worker performance by identifying skills assigned to a digital worker that are sufficiently similar to cause ambiguity.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as disambiguation program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
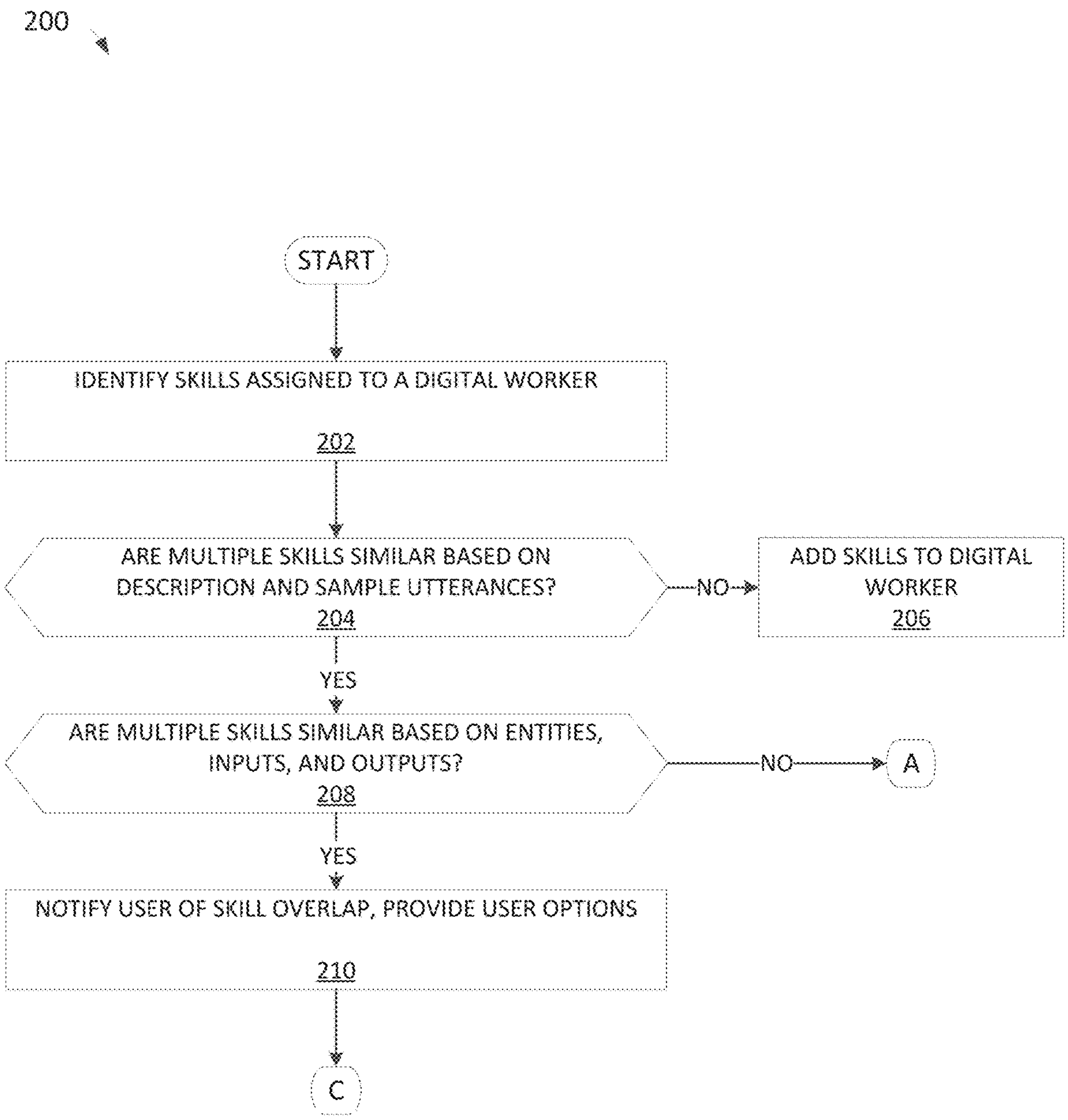
FIG. 2 depicts flowchart 200 illustrating the operations of disambiguation program 150 of computing environment 100, in accordance with the exemplary embodiments.

FIG. 2 depicts an exemplary flowchart 200 illustrating the operations of disambiguation program 150 of computing environment 100, in accordance with the exemplary embodiments.

As previously noted, digital workers are a category of software robots that are trained to perform specific tasks or processes in partnership with human colleagues. Digital workers are assigned the skills needed to perform the tasks and multiple digital workers may be orchestrated to simultaneously perform multiple tasks.

A digital worker can be assigned multiple skills, which may inadvertently overlap. This overlap may cause ambiguity when the digital worker attempts to perform a task, for example when multiple skills are triggered simultaneously. Currently, however, there is no method to determine whether two skills assigned to the digital worker overlap.

The present invention was conceived to improve the performance of digital workers by mitigating the risk of assigning overlapping skills that result in ambiguity and improper performance. As will be described in greater detail forthcoming, the invention first determines whether two or more skills assigned to a digital worker overlap. Overlapping skills cause ambiguity in that the digital worker is unsure which of the multiple skills to execute when multiple skills are invoked, for example skills invoked by a user input. The invention may determine whether the skills overlap based on, for example, comparing respective skill descriptions, utterances, entities, inputs, outputs, etc. If the invention determines that the skills overlap, the invention generates artifacts to disambiguate the skills and stores the artifacts in association with the respective skills. These artifacts may include, for example, disambiguation questions, sample utterances, etc., that may be readily deployed in future iterations to prevent the problems associated with ambiguity.

By disambiguating the overlapping skills, utilization of the present invention improves the accuracy, efficiency, and overall performance of digital workers by reducing the aforementioned ambiguity that results from invocating multiple, overlapping skills. In the case of a chatbot, for example, the present invention may disambiguate between a user intent to apply for a home loan and an intent to apply for an auto loan.

Figure 3:
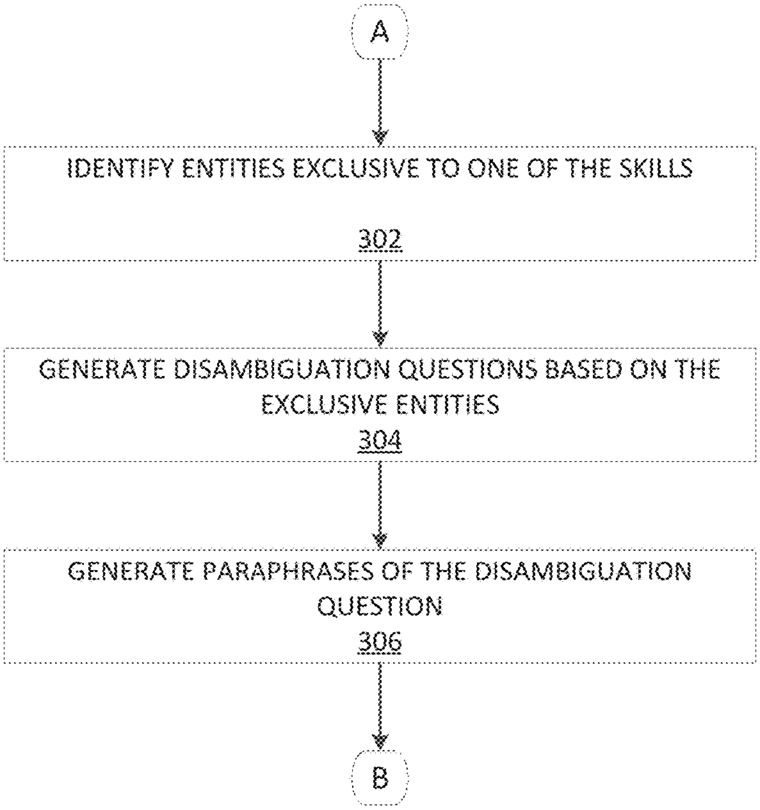
FIG. 3 depicts flowchart 300 illustrating the operations of disambiguation program 150 of computing environment 100, in accordance with the exemplary embodiments.
Figure 4:
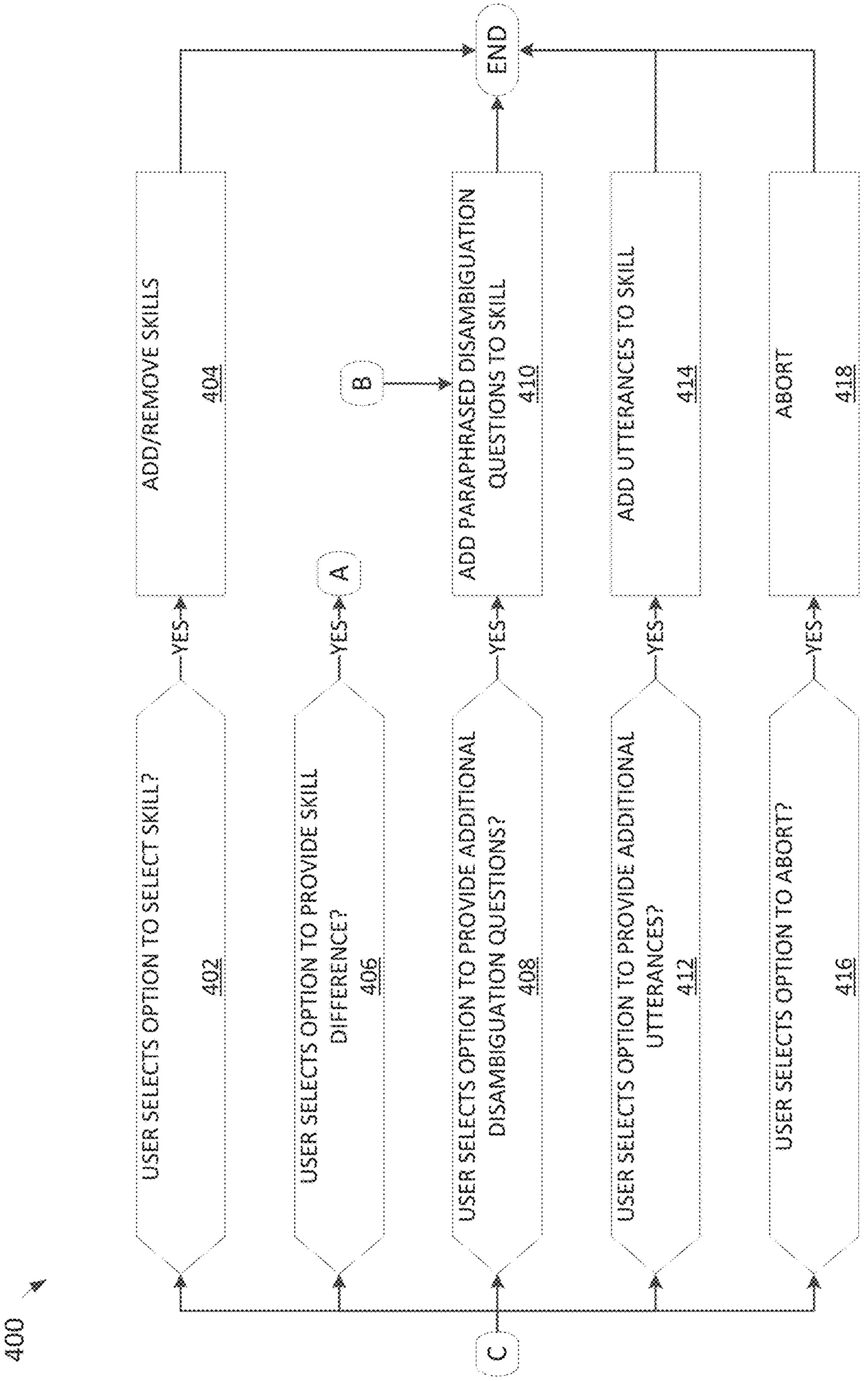
FIG. 4 depicts flowchart 400 illustrating the operations of disambiguation program 150 of computing environment 100, in accordance with the exemplary embodiments.

A detailed description of the present invention is now provided with respect to FIG. 2-4.

Disambiguation program 150 may identify skills assigned to a digital worker (step 202). In embodiments, digital workers may be software-based system that can independently execute meaningful parts of complex, end-to-end processes using a range of skills. A user may add skills to the digital worker by, for example, bootstrapping them from APIs or creating them. The skills added to the digital worker may specify a description of the skill, sample utterances invoking the skill, entities captured as part of the utterances, an input schema, an output schema, etc. For example, disambiguation program 150 may detect the addition of home loan processing skill and an auto loan processing skill added to a digital worker with the following specifications:

TABLE 1

| Skill | Home loan | Auto loan |
|---|---|---|
| Description | Home loan application | Auto loan application |
| Utterance | Apply for a loan | Apply for a loan |
| Input | {loan_amount, home.adress, home.floor_area} | {loan_amount, car.model, car.make, car.year} |
| Output | {loan_approval, loan_denial, approved_loan_amount} | {loan_approval, loan_denial, approved_loan_amount} |

As illustrated by Table 1, the description summarizes the skill while the utterance enumerates user input that invokes execution of the skill. The input schema defines the entities received as input for execution of the skill and the output schema defines the entities output following execution of the skill.

Disambiguation program 150 may determine whether multiple skills are similar based on description and sample utterances (decision 204). Because multiple skills may be added to a single digital worker, e.g., a first skill and a second skill (first and second used for differentiation purposes only), aspects of the first skill and second skill may overlap, causing ambiguity during interactions with the digital worker. To identify overlapping skills, disambiguation program 150 may first compare the description and sample utterances between skills to determine whether the skills are similar. Restated, disambiguation program 150 compares the description and/or utterances corresponding to a first skill with the description and/or utterances corresponding to a second skill. In embodiments, disambiguation program 150 may compare the descriptions and sample utterances using distance measuring techniques where the distance is a metric of similarity and a lesser distance is indicative of greater similarity. For example, disambiguation program 150 may convert the descriptions and/or sample utterances into a vector of numbers, i.e., embeddings, using a model, e.g., BERT, then compare the embeddings using cosine similarity. In embodiments, disambiguation program 150 may determine a similarity between the descriptions (a description similarity) and a similarity between the utterances (an utterance similarity) across the skills assigned to the digital worker and determine whether the skills are similar based on the description similarity, the utterance similarity, or both. In embodiments, disambiguation program 150 may average the similarities, weight the similarities, etc. For example, disambiguation program 150 may utilize machine learning to generate a model capable of weighting the description similarity and utterance similarity based on how well they capture overlapping skills during implementation, for example using a feedback loop.

If disambiguation program 150 determines that multiple skills are not similar based on the description and the sample utterances (decision 204, "NO" branch), then disambiguation program 150 may assign the multiple skills to the digital worker (step 206). Here, because the similarity was determined insufficient to indicate that the skills overlap, disambiguation program 150 may add the skills to the digital worker without resulting in skill redundancy and ambiguity. In embodiments where the multiple skills are already assigned to the digital worker, disambiguation program 150 may alternatively take no action such that the skills remain assigned to the digital worker.

If disambiguation program 150 determines that multiple skills are sufficiently similar based on the description and the sample utterances (decision 204, "YES" branch), then disambiguation program 150 may determine whether the multiple skills are similar based on the entities, inputs, and outputs (decision 208). In addition to determining a similarity across skill description and sample utterances above, disambiguation program 150 may further determine skill similarity based on comparing entities, inputs, and outputs of the first skill with those of the second skill. In embodiments, disambiguation program 150 may compare the entities, inputs, and outputs in a similar manner to above using distance metrics. Here, however, disambiguation program 150 further compares the multiple skills respective entities to compute an entity similarity, respective inputs to compute an input similarity, and respective outputs to compute an output similarity. In embodiments, disambiguation program 150 may determine whether the multiple skills are similar based on the entity similarity, input similarity, output similarity, or combination of the above. In embodiments, disambiguation program 150 may average the similarities, weight the similarities, etc., similar to that described above.

If disambiguation program 150 determines that multiple skills are not similar based on the entities, inputs, and outputs (decision 208, "NO" branch), then disambiguation program 150 may frame a disambiguation question to disambiguate the skills (flowchart 300, FIG. 3). Here, because disambiguation program 150 determines that the description and utterances are sufficiently similar, yet the entities, outputs, and inputs are insufficiently similar, disambiguation program 150 determines that the skills are slightly overlapping and proceeds to frame questions that will disambiguate the two skills. These questions may then be used as examples or negative examples for use with the skills. This process is now described in greater detail with respect to flowchart 300 of FIG. 3.

Disambiguation program 150 may identify entities exclusive to one of the multiple skills (step 302). By identifying entities that are associated with a first skill and not a second skill, disambiguation program 150 may utilize the exclusive entity within a user inquiry that is framed to disambiguate the skills. To identify entities exclusive to one of the multiple skills, disambiguation program 150 may, for example, apply a logical exclusive or (XOR) operation to the entities associated with the multiple skills. In embodiments, disambiguation program 150 may similarly identify exclusive entities/attributes that are exclusive to the input and the output schemas, as well.

For example, and with respect to the home loan and auto loan skills introduced above, entities that are mutually exclusive to each skill include a home exclusive to the home loan skill and an auto exclusive to the auto loan skill. In addition, disambiguation program 150 identifies the inputs/attributes exclusive to each skill include [home.address, home.floor_area] exclusive to the home loan skill and [car.model, car.make, car.year] exclusive to the auto loan skill.

Disambiguation program 150 may generate disambiguation questions based on the exclusive entities (step 304). In embodiments, disambiguation program 150 may generate the disambiguation questions using templatized models. The templatized models may input the exclusive entities into questions that, when answered (e.g., by a user or machine), disambiguate which of the skills is intended to be invoked by the user. The templates may include questions such as, do you have the value of <entity> or would you like <entity1> or <entity2>. By asking a question about the exclusive entity only relevant to one of the skills, the answer to the question is indicative of which skill the user attempts to invoke, and therefore disambiguates the skills.

Returning to the previously introduced example, disambiguation program 150 may generate a disambiguation question that includes the exclusive entities home and auto. The question may query the user would you like to apply for a home or an auto loan? or do you have the value of the home? Disambiguation program 150 may further generate the disambiguation question what is the square footage of the home based on input entity/attribute home.floor_area.

Disambiguation program 150 may generate paraphrases of the disambiguation question (step 306). In embodiments, disambiguation program 150 may generate paraphrases of the disambiguation question using a large language model fine tuned on an appropriate paraphrase data set. The paraphrase models (large language models) may take a sentence as an input and generate one or more paraphrases of that sentence as the output. Here, disambiguation program 150 may fine tune an LLM with input output sentence pairs of sentences that are paraphrased.

In the example above, for instance, disambiguation program 150 paraphrases the disambiguation question would you like to apply for a home or an auto loan as is this loan for a car or a home? and for a vehicle or real estate?

Operations of disambiguation program 150 continue at reference character "B" of FIG. 4 where disambiguation program 150 may proceed to add the paraphrased disambiguation questions in association with the skill (step 410). Disambiguation program 150 may add the question to the skill specifications such that subsequent instances of ambiguity are avoided through answering of the paraphrased disambiguation question. Moreover, the disambiguation can be performed without having to regenerate disambiguation questions. After having added the question to the skill, disambiguation program 150 may end or continue to identify skills assigned to a digital worker (step 202, FIG. 2). In embodiments, disambiguation program 150 may be configured to perform the operations of step 202 of FIG. 2 based on detecting the addition of skills to a digital worker, i.e., triggered by the addition of a new skill.

Returning now to the discussion of flowchart 200 of FIG. 2, if disambiguation program 150 determines that the multiple skills are sufficiently similar based on the entities, inputs, and outputs (decision 208, "YES" branch), then disambiguation program 150 may notify a user of the skill overlap and provide the user options to mitigate or remedy the overlapping skills (step 210). The notification may indicate to the user that multiple skills are being invoked and that disambiguation is recommended to avoid improper performance. Disambiguation program 150 may provide options to the user that include, for example, 1) selection of one of the skills; 2) providing a natural language description of the differences between the skills; 3) providing additional disambiguation questions; 4) providing additional utterances; and 5) an option to abort adding the skills to the digital worker.

Operations of disambiguation program 150 continue at reference character "C" of flowchart 400 of FIG. 4 where disambiguation program 150 may receive a user selection of at least one of the provided options.

If disambiguation program 150 receives a user selection to select one of one of the multiple skills (decision 402, "YES" branch), then disambiguation program 150 may add/remove the selected skills (i.e., the first or second skill) from the digital worker (step 404). For example, if an existing skill is selected instead of a new skill, then the new skill is not added to (or removed from) the digital worker. If a new skill is selected over an existing skill, the existing skill is removed from the digital worker and the new skill is added to the digital worker, etc. By modifying the skills added to and removed from the digital worker, disambiguation program 150 prevents the digital worker from being assigned overlapping skills that create ambiguity.

If disambiguation program 150 receives a user selection to provide differences in natural language between the skills (decision 406, "YES" branch), then disambiguation program 150 may frame a question for the user to disambiguate the skills (flowchart 300 of FIG. 3). Similar to the manner in which disambiguation program 150 framed a question based on entities exclusive to the skills earlier, here, disambiguation program 150 may frame the question instead based on a natural language explanation of the difference between the skills, e.g., one received from the user or a machine. More specifically, disambiguation program 150 may extract key words and/or key phrases from the natural language explanation using natural language processing (NLP) techniques, where the key phrase is a string (e.g., character(s)/word(s)) of the sentence that conveys the main idea of the whole sentence. In embodiments, disambiguation program 150 identifies the key phrase as the sub string having a closest (shortest distance) embedding to an embedding of the complete natural language explanation. For example, disambiguation program 150 may compare using cosine similarity the embeddings of the whole natural language explanation to the embeddings of N-grams within the natural language explanation to identify N-grams having a closest embedding to the that of the whole explanation. The key phrases may then be input into a templatized model (similar to step 304), for example generating the sentence is <keyphrase>, and is paraphrased (similar to step 306) before being added to the skill (step 410).

In the example introduced above, for instance, a user may indicate via natural language explanation that the home loan skill is to be invoked for all locations outside of a specified location. Based thereon, disambiguation program 150 generates a question inquiring whether the location of the user is outside the specified location and adds paraphrases of the question, for example can you tell me if your location is outside the specified location, to the skill specification for subsequent inquiry.

If disambiguation program 150 receives a user selection to provide additional disambiguation questions (decision 408, "YES" branch), then disambiguation program 150 may add the disambiguation questions to the skill (step 410). As noted previously, once added, these questions may be asked to disambiguate the skills without the need for the analysis described herein, thereby improving performance through invoking fewer errors and decreased processing times.

With reference again to the home and auto loan skills exemplified above, additional questions received may include are you trying to purchase a vehicle? and are you trying to purchase a home?

If disambiguation program 150 receives a user selection to provide additional utterances (decision 412, "YES" branch), then disambiguation program 150 may add the utterances to the skill (step 414). In embodiments, these utterances are exclusive to one of the skills and provide additional language for invoking the one skill aside from the existing utterances that may inadvertently invoke multiple skills. Disambiguation program 150 may be configured to further remove an existing utterance that originally invoked the multiple skills, thereby replacing the problematic utterance and removing the opportunity for ambiguity. For example, disambiguation program 150 may remove an utterance identified as similar to that of other skills from any skills in which a new utterance is added.

In the home and auto loan skills exemplified above, additional utterances may include get approved for a vehicle and buy a home. Disambiguation program 150 may further remove the utterance apply for a loan that originally caused the ambiguity.

If disambiguation program 150 receives a user selection to abort (decision 416, "YES" branch) or the user fails to make any other selection, e.g., after a timeout period, then disambiguation program 150 may abort. Disambiguation program 150 may then end or continue to monitor for the addition of skills to a digital worker (step 202, FIG. 2).

FIG. 3 depicts flowchart 300 illustrating the operations of disambiguation program 150 of computing environment 100, in accordance with the exemplary embodiments.

FIG. 4 depicts flowchart 400 illustrating the operations of disambiguation program 150 of computing environment 100, in accordance with the exemplary embodiments.

The invention claimed is:

1. A computer-implemented method for mitigating digital worker skill overlap, the method comprising:

in response to one of a first skill or a second skill being newly added to a digital worker that is configured to perform automated tasks by invoking skills in response to skill invocation requests:

detecting a similarity between the first skill and the second skill assigned to the digital worker by determining whether a similarity between at least one of a description, utterance, entity, input, and output corresponding to the first skill and the second skill exceeds a threshold;

generating, using a templatized model, a disambiguation question to disambiguate the first skill from the second skill for use when a subsequent invocation matches both the first skill and the second skill;

disambiguating the first skill from the second skill based on an answer to the disambiguation question by interpreting the answer in view of the disambiguation question to determine which one of the first skill or the second skill corresponds to the answer and recording an association between the answer and the determined one of the first skill or the second skill for use in selecting a skill when the subsequent invocation matches both the first skill and the second skill;

generating, using a trained large language model, one or more paraphrases of the disambiguation question;

storing the disambiguation question and the one or more paraphrases of the disambiguation question as disambiguation artifacts in a skill specification associated with at least one of the first skill or the second skill in a skill repository used by the digital worker; and in response to receiving the subsequent invocation that matches both the first skill and the second skill, invoking one of the first skill or the second skill based on the disambiguation artifacts in the skill specification.

2. The computer-implemented method of claim 1, further comprising:

prompting at least one of the disambiguation question or the one or more paraphrases of the disambiguation question from the disambiguation artifacts stored in the skill specification in response to at least one of the first skill or the second skill being subsequently invoked and a determination that a current invocation matches both the first skill and the second skill.

3. The computer-implemented method of claim 1, wherein the generating the disambiguation question further comprises:

identifying one or more exclusive entities that are exclusive to the first skill or the second skill based on entities defined in respective skill specifications of the first skill and the second skill; and generating the disambiguation question based on the one or more exclusive entities such that the disambiguation question explicitly references at least one of the one or more exclusive entities.

4. The computer-implemented method of claim 3, wherein the identifying the one or more exclusive entities further comprises:

applying an exclusive or (XOR) logic operation to entities associated with the first skill and the second skill as defined in the respective skill specifications.

5. The computer-implemented method of claim 1, wherein the generating the disambiguation question further comprises:

receiving a natural language explanation differentiating the first skill from the second skill;

identifying a key phrase within the natural language explanation; and generating the disambiguation question based on the key phrase such that the disambiguation question embodies, in an interrogative form, a differentiation between the first skill and the second skill expressed in the natural language explanation.

6. The computer-implemented method of claim 5, wherein the identifying the key phrase further comprises:

generating first embeddings for the natural language explanation and second embeddings for one or more strings within the natural language explanation; and identifying as the key phrase the one or more strings corresponding to the second embeddings having a shortest distance from the first embeddings of the natural language explanation in an embedding space.

7. The computer-implemented method of claim 1, wherein the detecting the similarity between the first skill and the second skill further comprises:

determining whether the similarity between at least one of the description, the utterance, the entity, the input, and the output corresponding to the first skill and the second skill exceed the threshold by computing similarity measures between respective skill specifications of the first skill and the second skill.

8. A computer program product for mitigating digital worker skill overlap, the computer program product comprising at least one non-transitory computer-readable medium having program instructions embodied therewith, the program instructions executable by a processor to cause the processor to:

in response to one of a first skill or a second skill being newly added to a digital worker that is configured to perform automated tasks by invoking skills in response to skill invocation requests:

detect a similarity between the first skill and the second skill assigned to the digital worker by determining whether a similarity between at least one of a description, utterance, entity, input, and output corresponding to the first skill and the second skill exceeds a threshold;

generate, using a templatized model, a disambiguation question to disambiguate the first skill from the second skill for use when a subsequent invocation is determined to match both the first skill and the second skill;

disambiguate the first skill from the second skill based on an answer to the disambiguation question by interpreting the answer in view of the disambiguation question to determine which one of the first skill or the second skill corresponds to the answer and recording an association between the answer and the determined one of the first skill or the second skill for use in selecting a skill when the subsequent invocation matches both the first skill and the second skill;

generate, using a trained large language model, one or more paraphrases of the disambiguation question;

store the disambiguation question and the one or more paraphrases of the disambiguation question as disambiguation artifacts in a skill specification associated with at least one of the first skill or the second skill in a skill repository used by the digital worker; and in response to receiving the subsequent invocation that matches both the first skill and the second skill, invoke one of the first skill or the second skill based on the disambiguation artifacts in the skill specification.

9. The computer program product of claim 8, wherein the program instructions are further executable by the processor to cause the processor to:

prompt at least one of the disambiguation question or the one or more paraphrases of the disambiguation question from the disambiguation artifacts stored in the skill specification in response to at least one of the first skill or the second skill being subsequently invoked and a determination that a current invocation matches both the first skill and the second skill.

10. The computer program product of claim 8, wherein the generating the disambiguation question further comprises:

identifying one or more exclusive entities that are exclusive to the first skill or the second skill based on entities defined in respective skill specifications of the first skill and the second skill; and generating the disambiguation question based on the one or more exclusive entities such that the disambiguation question explicitly references at least one of the one or more exclusive entities.

11. The computer program product of claim 10, wherein the identifying the one or more exclusive entities further comprises:

applying an exclusive or (XOR) logic operation to entities associated with the first skill and the second skill as defined in the respective skill specification.

12. The computer program product of claim 8, wherein the generating the disambiguation question further comprises:

receiving a natural language explanation differentiating the first skill from the second skill;

identifying a key phrase within the natural language explanation; and generating the disambiguation question based on the key phrase such that the disambiguation question embodies, in an interrogative form, a differentiation between the first skill and the second skill expressed in the natural language explanation.

13. The computer program product of claim 12, wherein the identifying the key phrase further comprises:

generating first embeddings for the natural language explanation and second embeddings for one or more strings within the natural language explanation; and identifying as the key phrase the one or more strings corresponding to the second embeddings having a shortest distance from the first embeddings of the natural language explanation in an embedding space.

14. The computer program product of claim 8, wherein the detecting the similarity between the first skill and the second skill further comprises:

determining whether the similarity between at least one of the description, the utterance, the entity, the input, and the output corresponding to the first skill and the second skill exceed the threshold by computing similarity measures between respective skill specifications of the first skill and the second skill.

15. A system comprising:

a memory configured to store computer-executable instructions; and a processor configured to execute at least one of the computer-executable instructions that:

in response to one of a first skill or a second skill being newly added to a digital worker that is configured to perform automated tasks by invoking skills in response to skill invocation requests:

detects a similarity between the first skill and the second skill assigned to the digital worker by determining whether a similarity between at least one of a description, utterance, entity, input, and output corresponding to the first skill and the second skill exceeds a threshold;

generates, using a templatized model, a disambiguation question to disambiguate the first skill from the second skill for use when a subsequent invocation is determined to match both the first skill and the second skill;

disambiguates the first skill from the second skill based on an answer to the disambiguation question by interpreting the answer in view of the disambiguation question to determine which one of the first skill or the second skill corresponds to the answer and recording an association between the answer and the determined one of the first skill or the second skill for use in selecting a skill when the subsequent invocation matches both the first skill and the second skill;

generates, using a trained large language model, one or more paraphrases of the disambiguation question;

stores the disambiguation question and the one or more paraphrases of the disambiguation question as disambiguation artifacts in a skill specification associated with at least one of the first skill or the second skill in a skill repository used by the digital worker; and in response to receiving the subsequent invocation that matches both the first skill and the second skill, invokes one of the first skill or the second skill based on the disambiguation artifacts in the skill specification.

16. The system of claim 15, wherein the at least one of the computer-executable instructions further:

prompts at least one of the disambiguation question or the one or more paraphrases of the disambiguation question from the disambiguation artifacts stored in the skill specification in response to at least one of the first skill or the second skill being subsequently invoked and a determination that a current invocation matches both the first skill and the second skill.

17. The system of claim 15, wherein the generating the disambiguation question further comprises:

identifying one or more exclusive entities that are exclusive to the first skill or the second skill based on entities defined in respective skill specifications of the first skill and the second skill; and generating the disambiguation question based on the one or more exclusive entities such that the disambiguation question explicitly references at least one of the one or more exclusive entities.

18. The system of claim 17, wherein the identifying the one or more exclusive entities further comprises:

applying an exclusive or (XOR) logic operation to entities associated with the first skill and the second skill as defined in the respective skill specifications.

19. The system of claim 15, wherein the generating the disambiguation question further comprises:

receiving a natural language explanation differentiating the first skill from the second skill;

identifying a key phrase within the natural language explanation; and generating the disambiguation question based on the key phrase such that the disambiguation question embodies, in an interrogative form, a differentiation between the first skill and the second skill expressed in the natural language explanation.

20. The system of claim 19, wherein the identifying the key phrase further comprises:

generating first embeddings for the natural language explanation and second embeddings for one or more strings within the natural language explanation; and identifying as the key phrase the one or more strings corresponding to the second embeddings having a shortest distance from the first embeddings of the natural language explanation in an embedding space.

* * * * *